United States Patent
Marchal-George et al.

(10) Patent No.: US 6,660,897 B1
(45) Date of Patent: Dec. 9, 2003

(54) CATALYST BASED ON A NOBLE METAL WITH LOW DISPERSION, AND ITS USE IN CONVERTING HYDROCARBON FEEDS

(75) Inventors: Nathalie Marchal-George, Saint Genis Laval (FR); Eric Benazzi, Chatou (FR); Tivadar Cseri, Courbevoie (FR); Slavik Kasztelan, Rueil Malmaison (FR)

(73) Assignee: Institut Francais du Petrole, Rueil Mal Maison Cedex (FR)

( * ) Notice: Subject to any disclaimer, the term of this patent is extended or adjusted under 35 U.S.C. 154(b) by 0 days.

(21) Appl. No.: 09/562,478

(22) Filed: May 1, 2000

(30) Foreign Application Priority Data

Apr. 29, 1999 (FR) .............................. 99 05495

(51) Int. Cl.⁷ ........................... C07C 5/22; B01J 23/40; B01J 23/42; B01J 23/56; B01J 23/44

(52) U.S. Cl. ...................... 585/482; 502/74; 502/327; 502/332; 502/333; 502/334; 502/339

(58) Field of Search .......................... 502/325, 66, 74, 502/327, 332, 333, 334, 339, 351, 355, 439, 252, 258, 262, 328; 585/482

(56) References Cited

U.S. PATENT DOCUMENTS

| | | | | |
|---|---|---|---|---|
| 2,989,488 A | * | 6/1961 | Connor, Jr. et al. | 252/455 |
| 3,617,510 A | * | 11/1971 | Hayes | 208/111 |
| 3,939,059 A | * | 2/1976 | Antos | 208/139 |
| 3,969,267 A | * | 7/1976 | McVicker | 252/415 |
| 4,049,576 A | * | 9/1977 | Kovach et al. | 252/441 |
| 4,145,314 A | * | 3/1979 | Fung et al. | 252/437 |
| 4,431,574 A | * | 2/1984 | Bournonville et al. | 502/261 |
| 4,713,363 A | * | 12/1987 | Hucul | 502/262 |
| 4,849,385 A | * | 7/1989 | Huang et al. | 502/35 |
| 4,929,576 A | * | 5/1990 | Tsao et al. | 502/35 |
| 4,952,543 A | * | 8/1990 | Huang et al. | 502/35 |
| 5,188,996 A | * | 2/1993 | Huang et al. | 502/37 |
| 5,292,989 A | * | 3/1994 | Davis | 585/751 |
| 5,482,615 A | * | 1/1996 | Meitzner et al. | 208/139 |
| 5,496,788 A | * | 3/1996 | Domesle et al. | 502/333 |
| 5,763,348 A | * | 6/1998 | Fung et al. | 502/37 |
| 5,866,495 A | * | 2/1999 | Fung et al. | 502/37 |
| 6,077,489 A | * | 6/2000 | Klein et al. | 423/213.5 |
| 6,245,709 B1 | * | 6/2001 | Clark et al. | 502/326 |

FOREIGN PATENT DOCUMENTS

| | | | |
|---|---|---|---|
| EP | 0 438 492 B | * | 2/1995 |
| EP | 0 535 138 B | * | 3/1995 |
| EP | 0 899 013 A1 | | 3/1999 |
| GB | 2 307 651 A | | 6/1997 |
| WO | WO 95/24360 | | 9/1995 |
| WO | WO 95/26819 | | 10/1995 |

* cited by examiner

Primary Examiner—Cam N. Nguyen
(74) Attorney, Agent, or Firm—Millen, White, Zelano & Branigan, P.C.

(57) ABSTRACT

A catalyst comprising at least one noble metal deposited on an acidic support, wherein the dispersion of the noble metal is less than 20%.

26 Claims, 1 Drawing Sheet

Size in A

CATALYST BASED ON A NOBLE METAL WITH LOW DISPERSION, AND ITS USE IN CONVERTING HYDROCARBON FEEDS

CROSS-REFERENCE TO RELATED APPLICATION

This application is related to applicants concurrently filed application Attorney Docket No. PET 1839, entitled "Flexible Process For Producing Base Stock And Distillates By Conversion-Hydroisomerization Using A Catalyst With Low Dispersion Followed By Catalytic Dewaxing", based on French Applications 99/05.496 filed Apr. 29, 1999 and 00/02.363 filed Feb. 24, 2000 and Attorney Docket No. PET 1840, entitled "Flexible Process For Producing Base Stock And Middle Distillates By Conversion-Hydroisomerization Followed By Catalytic Dewaxing", based on French Applications 99/05.494 filed Apr. 29, 1999 and 00/02.364 filed Feb. 24, 2000.

The present invention relates to a catalyst used in processes for converting heavy feeds, in particular paraffin feeds containing reduced quantities of metals. This conversion is generally accompanied by hydroisomerization of n-paraffins.

When hydroconverting (particularly hydroisomerizing) feeds such as paraffin feeds from the Fischer-Tropsch process, or hydrocracking residues, it is of particular advantage to obtain very high value products such as base stock or middle distillates with a very good resistance to cold and a very good cetane index.

All catalysts currently used in hydroconversion and/or hydroisomerization are bifunctional, combining an acid function with a hydrogenating function. The acid function is provided by supports with large surface areas (in general 150 to 180 m$^2$/g) with a superficial acidity, such as halogenated aluminas (chlorinated or fluorinated in particular), phosphorus-containing aluminas, combinations of oxides of boron and aluminium, silica-aluminas and aluminosilicates. The hydrogenating function is provided either by one or more metals from group VIII of the periodic table such as iron, cobalt, nickel, ruthenium, rhodium, palladium, osmium, iridium and platinum, or by combining at least one group VI metal such as chromium, molybdenum or tungsten and at least one group VIII metal.

The balance between the two functions, acid and hydrogenating, is the fundamental parameter which governs the activity and selectivity of the catalyst. A weak acid function and a strong hydrogenating function produces catalysts with low activity which are selective towards isomerization while a strong acid function and a weak hydrogenating function produces catalysts which are highly active and selective towards cracking. A third possibility is to use a strong acid function and a strong hydrogenating function to obtain a highly active catalyst which is also highly selective towards isomerization. Thus by careful choice of each of the functions, it is possible to adjust the activity/selectivity properties of the catalyst.

A number of processes and catalysts exist.

U.S. Pat. No. 5,834,522 and International patent application WO-A-95/26819 describe an amorphous catalyst based on a noble metal and silica-alumina with precise physicochemical characteristics, including a noble metal dispersion in the range 20% to 100%.

In that process, and generally in all catalytic processes, it is known that to improve the performance of the catalyst, care must be taken that, among other factors, the dispersion of the noble metal is as high as possible. Thus during generation, for example, the operating conditions are precisely set so as to avoid the formation of agglomerates of metal and/or to re-disperse the agglomerated metal.

In complete contrast to that commonly accepted fact, during the course of research on the metallic phase it has been discovered that a low dispersion of the noble metal, advantageously associated with a particular distribution of metal particles, results in catalysts which are even more selective for isomerization.

More precisely, the invention provides a catalyst containing at least one noble metal deposited on a support, the dispersion of noble metal being less than 20%.

Preferably, the fraction of noble metal particles less than 2 nm in size represents at most 2% by weight of the noble metal deposited on the catalyst.

Advantageously, the size of at least 70% (preferably at least 80%, more preferably at least 90%) of the noble metal particles is over 4 nm (number %).

The support is advantageously an amorphous acidic support and contains no molecular sieve, the catalyst thus contains no molecular sieve.

The acidic support can be selected from the group formed by a silica alumina, boron oxide, a zirconia used alone or as a mixture of the two or with a matrix (for example non acidic).

The acidic support is generally selected from the group formed by a silica-alumina, a halogenated alumina (preferably fluorinated), an alumina doped with silicon (deposited silicon), an alumina-titanium oxide mixture, a sulphated zirconia, a zirconia doped with tungsten, and mixtures thereof or with at least one amorphous matrix selected from the group formed by alumina, titanium oxide, silica, boron oxide, magnesia, zirconia and clay, for example.

Preferred supports are amorphous silica-alumina and silica-alumina-titanium oxide (amorphous).

The acidity measurement is well known to the skilled person. It can, for example, be made by temperature programmed desorption (TPD) with ammonia, by infrared measurement of absorbed molecules (pyridine, CO . . . ), by a catalytic cracking test or by hydroconverting a model molecule.

A preferred catalyst of the invention comprises (and is preferably essentially constituted by) 0.05% to 10% by weight of at least one noble metal from group VIII deposited on an amorphous silica-alumina support.

Figure 1:
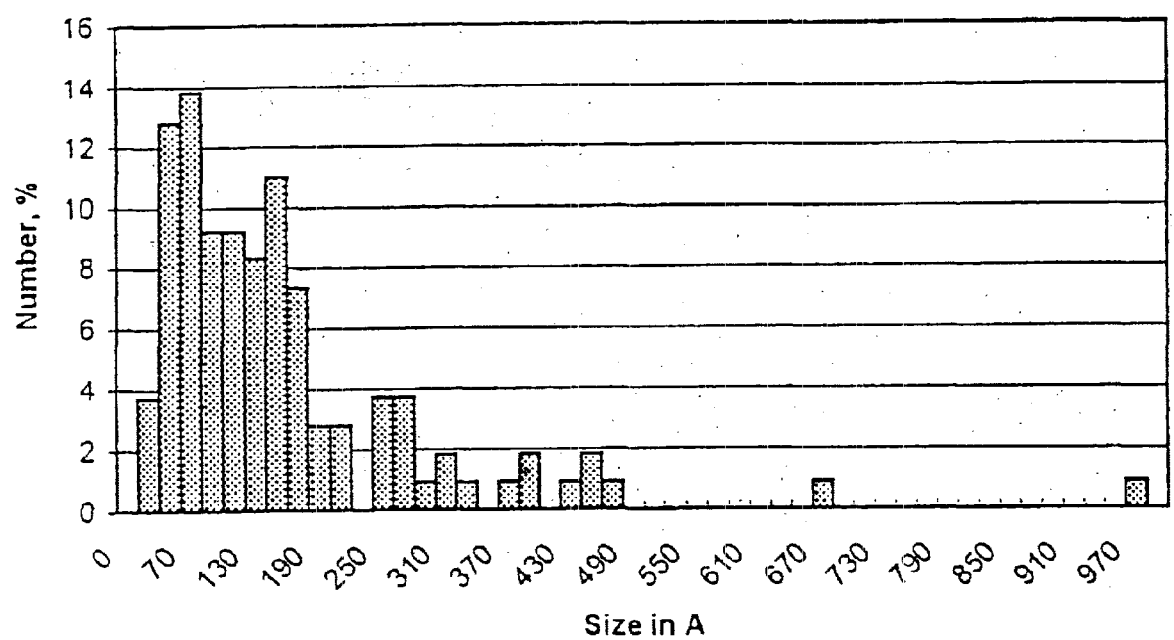
FIG. 1 depicts a histogram of Pt particles on catalyst A.

In more detail, the catalyst characteristics are as follows:

Silica content: The preferred support used to produce the catalyst described in the present patent is composed of silica SiO$_2$ and alumina Al$_2$O$_3$ from synthesis. The silica content of the support, expressed as a percentage by weight, is generally in the range 1% to 95%, advantageously in the range 5% to 95%, more preferably in the range 10% to 80% and still more preferably in the range 20% to 70%, or even 22% to 45%. This silica content can be accurately measured using X ray fluorescence.

Nature of noble metal (any catalyst): For this particular type of reaction, the metallic function is provided by a noble metal from group VIII of the periodic table, more particularly platinum and/or palladium.

Noble metal content (any catalyst): The noble metal content, expressed as the % by weight of metal with respect to the catalyst, is in the range 0.05% to 10%, more preferably in the range 0.1% to 5%.

Noble metal dispersion (any catalyst): The dispersion, representing the fraction of metal accessible to the reactant with respect to the total quantity of the metal of the catalyst, can be measured by $H_2/O_2$ titration for example. The metal is first reduced, i.e., it undergoes a treatment in a stream of hydrogen at a high temperature under conditions such that all of the platinum atoms which are accessible to hydrogen are transformed into the metal form. Then a stream of oxygen is passed under operating conditions which are such that all of the reduced platinum atoms accessible to the oxygen are oxidised to the $PtO_2$ form. By calculating the difference between the quantity of oxygen introduced and the quantity of oxygen leaving, the quantity of oxygen consumed can be determined. This latter value can be used to deduce the quantity of platinum which is accessible to the oxygen. The dispersion is then equal to the ratio of the quantity of platinum accessible to oxygen over the total quantity of platinum of the catalyst. In our case, the dispersion is less than 20%, it is also more than 1% or, preferably, 5%.

Particle size, measured by Transmission Electron Microscopy (any catalyst): In order to determine the size and distribution of the metal particles, we used transmission electron microscopy. After preparation, the catalyst sample was finely ground in an agate mortar then dispersed in ethanol using ultrasound. Samples were taken from different locations to ensure a true representation and were deposited on a copper grid coated with a thin carbon film. The grids were then air dried under an infrared lamp before being introduced into the microscope for observation. In order to estimate the average particle size of the noble metal, several hundred measurements were made from several tens of exposures. This set of measurements enabled a histogram of particle size distribution to be produced. We could then precisely estimate the proportion of particles corresponding to each particle size range.

Distribution of noble metal in the grain (any catalyst): The noble metal distribution represents the distribution of the metal inside the catalyst grain, the metal being well or poorly dispersed. Thus it is possible to obtain platinum which is poorly distributed (for example detected in a crown the thickness of which is substantially less than the grain radius) but well dispersed, i.e., all of the platinum atoms situated in the crown are accessible to the reactants. In our case, the platinum distribution is homogeneous, i.e., the platinum profile, measured using a Castaing microprobe method, has a distribution coefficient of more than 0.1, advantageously more than 0.2, preferably more than 0.5.

BET surface area: The BET surface area of the support (any support) is generally in the range 100 m$^2$/g to 500 m$^2$/g, preferably in the range 250 m$^2$/g to 450 m$^2$/g, and for silica-alumina based supports, more preferably in the range 310 m$^2$/g to 450 m$^2$/g.

Global pore volume of support: For silica-alumina based supports, it is generally less than 1.2 ml/g, preferably in the range 0.3 to 1.10 ml/g, and more advantageously less than 1.05 ml/g.

The silica-alumina and in general any support is prepared and formed using the usual methods which are well known to the skilled person. Advantageously, prior to impregnating the metal, the support is calcined, for example by means of a heat treatment at 300–750° C. (preferably 600° C.) for a period in the range 0.25 to 10 hours (preferably 2 hours) in 0–30% by volume of water vapour (preferably about 7.5% for a silica-alumina matrix).

The metal salt is introduced using one of the usual methods for depositing a metal (preferably platinum) on the surface of a support. One preferred method is dry impregnation which consists of introducing the metal salt into a volume of solution which is equal to the pore volume of the catalyst mass to be impregnated. Before the reduction operation and to obtain the metal particle size distribution, the catalyst is calcined in moist air at 300–750° C. (preferably 550° C.) for 0.25–10 hours (preferably 2 hours).

The partial pressure of $H_2O$ during calcining is, for example, 0.05 bars to 0.50 bars (preferably 0.15 bars). Other known treatment methods for producing less than 20% dispersion are also suitable.

The invention also concerns a process for converting feeds containing hydrocarbons with the catalyst described above. The conversion is usually accompanied by paraffin hydroisomerization. The process has the advantage of flexibility: depending on the degree of conversion, the production is directed towards oils or middle distillates. Conversion generally is in the range 5–90%.

Before using the conversion reaction, the metal contained in the catalyst is reduced. One preferred method for reducing the metal is treatment in hydrogen at a temperature in the range 150° C. to 650° C. and at a total pressure in the range 0.1 to 25 MPa. As an example, reduction consists of a constant temperature stage at 150° C. for 2 hours then raising the temperature to 450° C. at a rate of 1° C./min followed by a constant temperature stage of 2 hours at 450° C.; during the whole of this reduction step, the hydrogen flow rate is 1000 l of hydrogen/l of catalyst. It should also be noted that any ex-situ reduction method is suitable.

The process of the invention can be used to treat a variety of feeds such as cuts from Fischer-Tropsch processes, middle distillates (gas oils, distillates from FCC, i.e., LCO and HCO), vacuum residues, hydrocracking residues, atmospheric residues, polyalphaolefins, synthesis oils . . .

The feed to be treated is usually a $C_{10}^-$ cut containing compounds with an initial boiling point of about 170° C., preferably a heavy cut with a boiling point of at least 260° C., and advantageously at least 20%, or even at least 50% of the feed (preferably at least 80%) has a boiling point of at least 340° C. or even at least 350° C. Preferably, the initial boiling point is at least 370° C., or even at least 380° C.

Feeds which can be treated using the process of the invention can contain paraffins, olefins, naphthenes, aromatic compounds and also heterocycles, with a large proportion of high molecular weight n-paraffins and slightly branched paraffins, also of high molecular weight.

They may contain paraffin fragments or may be entirely paraffinic molecules, and the aromatic carbon atom content is at most 20% by weight of the totality of the carbon atoms in the feed.

These feeds generally contain molecules containing at least about 20 carbon atoms, containing paraffinic fragments or being entirely paraffin molecules. Hydroisomerization then leads to isoparaffins.

The catalyst as described is particularly active for converting (including hydroisomerizing) feeds from the Fischer-Tropsch process, for example, to obtain good yields of products which can then be used as components of lubricating products or to obtain middle distillates with good cold properties and a high cetane index.

Any clean feed can be treated. The term "clean feed" means feeds in which the sulphur content is less than 1000 ppm by weight, preferably less than 500 ppm by weight, more preferably less than 300 ppm by weight or still more preferably less than 200 ppm by weight. The nitrogen content is less than 200 ppm by weight, preferably less than 100 ppm by weight, more preferably less than 50 ppm by weight. The metal content in the feed, such as nickel or vanadium, is extremely reduced, i.e., less than 50 ppm by weight, more advantageously less than 10 ppm by weight, or preferably less than 2 ppm by weight.

The feed is brought into contact with the conversion-hydroisomerization catalyst in a conversion zone (or reactor) at a partial pressure of hydrogen of 2 to 25 MPa, advantageously 2 to 20 MPa, preferably 2 to 18 MPa, at a temperature in the range 200° C. to 450° C., advantageously in the range 250° C. to 450° C. preferably in the range 300° C. to 450° C. and more advantagously in the range 320° C. to 450° C., with an hourly space velocity in the range 0.1 to 10 $h^{-1}$, advantageously in the range 0.2 to 10 $h^{-1}$ and preferably in the range 0.5 to 5 $h^{-1}$, and a hydrogen/hydrocarbon volume ratio of 100 to 2000 liters/liter. The effluent from the conversion-hydroisomerization reactor is fractionated into different conventional petroleum cuts such as gas, gasoline, middle distillates and "isomerized residue". The fraction termed "isomerized residue" represents the heaviest fraction obtained during fractionation and the oily fraction is extracted from this. Traditionally, the oily fraction is extracted during the operation known as dewaxing. The choice of temperatures during the step for fractionating effluents from the conversion-hydroisomerization reactor can vary greatly depending on the specific needs of the refiner.

To obtain a clean feed at the conversion-hydroisomerization reactor inlet, it is often necessary to carry out prior hydrotreatment.

As an example, in the case where the contents of unsaturated or oxygen-containing products are capable of causing too great a deactivation of the catalytic system, the feed from the Fischer-Tropsch process must undergo hydrotreatment in a hydrotreatment zone before it enters the conversion-hydroisomerization zone. Hydrogen is reacted with the feed in contact with a hydrotreatment catalyst which acts to reduce the amount of unsaturated and oxygen-containing hydrocarbon molecules produced during the Fischer-Tropsch synthesis. The oxygen content is thus at most 0.2% by weight and preferably at most 0.1% by weight. The effluent from this hydrotreatment zone is then treated in the conversion-hydroisomerization zone.

The hydrotreatment catalyst (which can be used for any of the cited feeds) is a non cracking catalyst which comprises at least one matrix, preferably based on alumina and at least one metal or metal compound having a hydrodehydrogenating function. The matrix is selected from the group formed by alumina, silica-alumina, boron oxide, magnesia, zirconia, titanium oxide, clay or a combination of these oxides. The hydrodehydrogenating function can preferably be ensured by at least one metal or metal compound from group VIII such as nickel or cobalt. It is also possible to use a combination of at least one metal or metal compound from group VI (in particular molybdenum or tungsten) and at least one metal or metal compound from group VIII (in particular cobalt or nickel) of the periodic table. The hydrodehydrogenating component can also be a noble metal (preferably platinum, palladium), for example in an amount or 0.01% to 5% by weight with respect to the finished catalyst. The concentration of non noble group VIII metal, when used, is generally in the range 0.01% to 15% by weight with respect to the finished catalyst.

This catalyst can also advantageously contain phosphorus; this compound provides hydrotreatment catalysts with two advantages: facility of preparation in particular when impregnating nickel solutions and molybdenum solutions, and better hydrogenation activity.

The total concentration of groups VI and VIII metals, expressed as the metal oxides, is in the range 5% to 40% by weight, preferably in the range 7% to 30% by weight, and the weight ratio, expressed as the oxide of the metal (or metals) from group VI over the metal (or metals) from group VIII, is in the range 1.25 to 20, preferably in the range 2 to 10. The concentration of phosphorus oxide $P_2O_5$ is generally less than 15% by weight, preferably less than 10% by weight.

A catalyst containing boron and phosphorus as described in European patent EP-A-0 297 949 can be used. The sum of the quantities of boron and phosphorus, expressed respectively as the weight of boron trioxide ($B_2O_3$) and phosphorus pentoxide ($P_2O_5$) with respect to the weight of support, is about 5% to 15%, and the atomic ratio or boron to phosphorus is about 1:1 to 2:1, and at least 40% of the total pore volume of the finished catalyst is contained in pores with an average diameter of more than 13 nanometers. Preferably, the quantity of metal from group VI such as molybdenum or tungsten is such that the atomic ratio of phosphorus to group VIB metal is about 0.5:1 to 1.5:1; the quantities of group VIB metal and group VIII metal such as nickel or cobalt are such that the atomic ratio of the group VIII metal to the group VIB metal is about 0.3:1 to 0.7:1. The quantities of group VIB metal, expressed as the weight of metal with respect to the weight of finished catalyst, is about 2% to 30%, and the quantity of group VIII metal, expressed as the weight of metal with respect to the weight of finished catalyst, is about 0.01% to 15%.

NiMo on alumina, NiMo on alumina doped with boron and phosphorus and NiMo on silica-alumina catalysts are preferred. Advantageously, eta alumina or gamma alumina is selected.

In the hydrotreatment zone, the partial pressure of hydrogen is in the range 0.5 to 2.5 MPa, advantageously in the range 0.5 to 20 NPa and preferably in the range 2 to 18 MPa, and the temperature is in the range 250° C. to 400° C. and preferably in the range 300° C. to 380° C. Under these operating conditions, the cycle time for the catalytic system is at least one year and preferably 2 years and the catalyst deactivation, i.e., the increase in temperature to which the catalytic system is subjected for conversion to remain constant, is less than 5° C./month and preferably less than 2.5° C./month. Under these conditions, the amount of unsaturated and oxygen-containing molecules is reduced to less than 0.5% and generally to about 0.1%

The effluent from the conversion of the invention (in particular with hydroisomerization; and in particular from a feed which has previously been hydrotreated) is fractionated into at least a middle distillate (kerosine, gas oil) and/or at least one heavy fraction which preferably has an initial boiling point of at least 350° C., said heavy fraction (oil) optionally undergoing solvent dewaxing.

The characteristics of the oils obtained using the process of the invention are very good because of their highly paraffinic nature. As an example, the viscosity index (VI) of the oil obtained after MEK/toluene solvent dewaxing the heavy fraction ($350^+$, preferably $380^+$) is 130 or more and preferably more than 135, and the pour point is −12° C. or less. The oil yield with respect to the residue depends on the overall conversion of the feed. In the case of the present invention, this yield is in the range 5% to 100% by weight and preferably more than 10%, still more advantageously more than 50%. In an advantageous implementation, at least a portion of the non oil fraction obtained during the solvent dewaxing stage for the isomerized residue is recycled to the hydrotreatment zone and/or to the hydroisomerization zone.

The middle distillates obtained using the process of the invention have very good cold characteristics (high proportion of isomerized paraffins) and a high cetane index (high proportion of paraffins). As an example, the cetane index is more than 55, preferably more than 60. The pour point is less than −7° C. and preferably less than −12° C. The middle distillate yield depends on the global conversion of the feed. In the present invention, this yield is in the range 5% to 100% by weight, preferably more than 10% and more preferably more than 60%. In an advantageous implementation, at least a portion of the isomerized residue is recycled to the hydrotreatment zone and/or to the hydroisomerization zone to increase the degree of isomerization of the paraffins and thus further improve the cold properties of the middle distillates obtained.

Compared to well dispersed catalysts (such as those described in WO-95/26819, for example), the catalysts of the invention have a substantially improved selectivity towards isomerized products as the examples will show. Thus the qualities of the oils are improved, and the cold properties and the cetane index are improved.

The following examples illustrate the characteristics of the invention without in any way limiting its scope.

EXAMPLE 1

Preparation of Catalyst A, in Accordance With the Invention

The support was a silica-alumina used in the form of extrudates. It contained 29.3% by weight of silica $SiO_2$ and 70.7% by weight of alumina $Al_2O_3$. Before adding any noble metal, the specific surface area of the silica-alumina was 330 m$^2$/g and its total pore volume was 0.87 cm$^3$/g.

The corresponding catalyst A was obtained after impregnating the noble metal onto the support. A platinum salt $Pt(NH_3)_4Cl_2$ was dissolved in a volume of solution corresponding to the total pore volume to be impregnated. The solid was then calcined for 2 hours in moist air (partial pressure of $H_2O$=0.15 bars) at 550° C. The platinum content was 0.60% by weight. The pore volume, measured on the catalyst, was 0.82 cm$^3$/g; the BET surface area, measured on the catalyst, was 287 m$^2$/g and the mean mesopore diameter, measured on the catalyst, was 7 nm. The pore volume corresponding to pores with a diameter in the range 4 nm and 10 nm was 0.37 cm$^3$/g, i.e., 44% of the total pore volume. The platinum dispersion measured by $H_2/O_2$ titration was 19%. The results obtained by local analysis of transmission electron microscopic exposures indicated a noble metal particle distribution where the fraction of less than 2 nm exhibited traces of platinum, at most 2% by weight of metal. The histogram of the fraction of particles more than 2 nm in size is represented in the figure below. This histogram shows that particles with a size in the range 13±6 nm represented at least 70 number % of the particles.

EXAMPLE 2

Preparation of Catalyst B, Not in Accordance With the Invention

Catalyst B was prepared from the same silica-alumina support as catalyst A. Catalyst B was also obtained by impregnating the noble metal onto the support. The platinum salt $H_2PtCl_6$ was dissolved in a volume of solution corresponding to the total pore volume to be impregnated. The solid was then calcined for 2 hours in dry air at 520° C. The platinum content was 0.60% by weight. The BET surface area of the catalyst was 312 m$^2$/g. The platinum dispersion, measured by $H_2/O_2$ titration, was 99%. The platinum was difficult to discern using transmission electron microscopy. When it was observed, it was in the form of small particles of 0.7 to 1.0 nm.

EXAMPLE 3

In the Table Below, We Have Compared the Performances Obtained for Model Molecules of Catalysts A (in Accordance With the Invention) and B (Not in Accordance With the Invention)

The catalytic test consisted of isomerizing n-heptane at 330° C. and 350° C. in 60 bars total pressure with an HSV of 1 h$^{-1}$ and a $H_2$/heptane flow rate ratio of 1000 l/l. The catalysts tested were first reduced in situ in the unit. The table below compares the activities (conversion and selectivity) obtained with catalysts A and B. The conversion was calculated from the n-heptane content. Isomerization, hydrogenolysis and cracking were calculated from the products obtained. Isomerization was the desired reaction while hydrogenolysis and cracking were side reactions. For each scale, we show the value obtained at 330° C. (1$^{st}$ value) and that obtained at 350° C. (2$^{nd}$ value). The catalyst selectivity is defined as the mean of the isomerization/conversion ratios calculated at 330° C. and 350° C.

| Catalyst | Dispersion % | Conversion (%) | Isomerization (%) | Hydrogenolysis (%) | Cracking (%) | Isom/conv selectivity % |
|---|---|---|---|---|---|---|
| A | 19 | 17.5–33.7 | 17.4–33.3 | 0 | 0.1–0.4 | 99 |
| B | 99 | 31.3–45.0 | 16.6–28.8 | 10.4–13.0 | 3.7–4.8 | 59 |

A comparison between catalysts A and B showed that a better selectivity for isomerization was obtained with catalyst A of the invention. The selectivity, defined as the isom/conv ratio, was 99% for catalyst A. For this catalyst, hydrogenolysis was non existent. This result can be considered to be linked to the low dispersion of the metallic phase. Hydrogenolysis appears in this case to be linked to the presence of small particles (<0.2 nm) corresponding to good dispersion of the metallic phase. It can be seen that catalyst B, not in accordance with the invention, had a low isomerization selectivity. This low selectivity was largely due to the presence of hydrogenolysis due to small particles. In contrast, in catalyst A these particles are almost non existent as shown by the transmission electron microscopy. Thus unexpectedly, the low dispersion of the metal on the catalyst was highly advantageous for isomerization selectivity.

EXAMPLE 4

Evaluation of Catalysts A and B for Hydroisomerization of a Fischer-Tropsch Feed for the Production of Oils and Middle Distillates The catalysts the preparation of which was described in Examples 1 and 2 were used to hydroisomerize a paraffin feed from the Fischer-Tropsch synthesis with the principal aim of producing oils. In order to be able to directly use the hydroisomerization catalysts, the feed had first been hydrotreated and the oxygen content brought to below 0.1% by weight. The principal characteristics of the hydrotreated feed were as follows:

| | |
|---|---|
| initial point | 170° C. |
| 10% point | 197° C. |
| 50% point | 350° C. |
| 90% point | 537° C. |
| End point | 674° C. |
| 380+ (weight %) | 42 |
| Pour point | +73° C. |
| Density (20/4) | 0.787 |

The catalytic test unit comprised a single fixed bed reactor used in up-flow mode, into which 80 ml of catalyst was introduced. The catalyst was then placed under a pure hydrogen atmosphere at a pressure of 6 MPa to ensure reduction of the platinum oxide to metallic platinum, then finally the feed was injected. The total pressure was 10 MPa; the hydrogen flow rate was 1000 liters of gaseous hydrogen per liter of injected feed; the hourly space velocity was 2 $h^{-1}$; and the reaction temperature was 350° C. After reacting, the effluents were fractionated into light products (gasoline, IP—150° C.), middle distillates (150–3800° C.), and residue ($380^+$). The residue was solvent dewaxed (methylisobutylketone) at −20° C. and the characteristics of the oil obtained were measured.

The table below shows the yields for the different fractions and the characteristics of the oils obtained directly with the feed and with the effluents hydroisomerized on catalyst A (in accordance with the invention) and those hydroisomerized on catalyst B (not in accordance with the invention).

| Catalyst | Hydro-treated feed / | Hydroisomerized effluent A | Hydroisomerized effluent B |
|---|---|---|---|
| Density of effluents at 15° C. | 0.790 | 0.779 | 0.768 |
| Wt % 380−/effluents | 58 | 69 | 72 |
| Wt % 380+/effluents | 42 | 31 | 28 |
| Quality of 380+ residue | | | |
| Dewaxing yield (wt %) | 6 | 54 | 37 |
| Oil/feed yield | 2.5 | 16.7 | 10.4 |
| Quality of oil | | | |
| VI (viscosity index) | 143 | 138 | 132 |
| Cut distribution | | | |
| IP-150 | 0 | 12 | 23 |
| 150–380 | 58 | 57 | 49 |
| 380+ | 42 | 31 | 28 |
| Net conversion of 380− (%) | / | 26.2 | 33.3 |

It can clearly be seen that the non hydroisomerized feed had an extremely low yield of oil while after the hydroisomerization operation the oil yield was satisfactory. The comparison between catalysts A and B shows that the oil yield obtained with catalyst A (in accordance with the invention) was higher than that obtained with catalyst B (not in accordance). Further, the quality of the oil obtained was better with catalyst A (VI=138) than with catalyst B (VI= 132). Here again, this result appears to be linked to the presence of very small particles of platinum on catalyst B which encourages the hydrogenolysis side reaction and which increases the cracking activity of catalyst B with respect to catalyst A (in accordance with the invention). This increase in the cracking activity of catalyst B with respect to catalyst A can be seen in the net conversion of 380 − which is substantially higher with catalyst B than with catalyst B, and in the cut distribution of the effluents obtained. Catalyst B led to a light fraction, IP—150° C. (23%) which was higher than that obtained with catalyst A (only 12%).

EXAMPLE 5

Evaluation of Catalyst A During a Test Carried Out to Produce Middle Distillates The catalyst the preparation of which was described in Example 1 was used to hydroisomerize a paraffin feed from the Fischer-Tropsch synthesis with the principal aim of producing middle distillates (kerosine+gas oil). In order to be able to directly use the hydroisomerization catalyst, the feed was first hydrotreated and the oxygen content brought to below 0.1% by weight. The principal characteristics of the hydrotreated feed were as follows:

| | |
|---|---|
| initial point | 170° C. |
| 10% point | 197° C. |
| 50% point | 350° C. |
| 90% point | 537° C. |
| End point | 674° C. |
| 380+ (weight %) | 42 |
| Pour point | +73° C. |
| Density (20/4) | 0.787 |

The catalytic test unit comprised a single fixed bed reactor in up-flow mode, into which 80 ml of catalyst was introduced. The catalyst was then placed under a pure hydrogen atmosphere at a pressure of 12 MPa to ensure reduction of the platinum oxide to metallic platinum then finally the feed was injected. The total pressure was 12 MPa; the hydrogen flow rate was 1000 liters of gaseous hydrogen per liter of injected feed the hourly space velocity was 1 $h^{-1}$ and the reaction temperature was 365° C. After reaction, the effluents were fractionated into light products (gasoline, IP—150° C.), kerosine (150–250° C.), gas oil (250–380° C.) and residue ($380^+$).

The yields and characteristics for the different fractions of the effluents hydroisomerized on catalyst A are shown below.

| Cut distribution: (wt %) | |
|---|---|
| IP-150° C. | 17 |
| 150-250° C. | 33 |
| 250-380° C. | 47 |
| 380+ | 3 |
| Quality of distillate products: | |
| 150–250° C. | Smoke point: 53 mm |
| | Freezing point: −41° C. |
| 250–380° C. | Cetane index: >70 |
| | Pour point: −25° C. |

Catalyst A produced good yields of middle distillates (weight of 150–250° C. fraction+weight of 250–380° C. fraction=80% by weight) from a paraffin feed from the Fischer-Tropsch synthesis, and the middle distillates obtained were of very high quality.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 99/05.495, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A catalyst containing at least one noble metal deposited on an acidic support, characterized in that the dispersion of the noble metal is less than 20% wherein the fraction of noble metal particles less than 2 nm in size represents at most 2% by weight of the noble metal deposited on the catalyst.

2. A catalyst according to claim 1, characterized in that at least 70% of the noble metal particles are more than 4 nm in size.

3. A catalyst according to claim 1, characterized in that the support is amorphous.

4. A catalyst according to claim 3, characterized in that at least 70% of the noble metal particles are more than 4 nm in size.

5. A catalyst according to claim 1, characterized in that the support is silica-alumina, boron oxide or zirconia.

6. A catalyst according to claim 5, characterized in that the support farther comprises at least one amorphous matrix selected from the group consisting of alumina, titanium oxide, silica, boron oxide, magnesia, zirconia and clay.

7. A catalyst according to claim 1, characterized in that the support is a silica-alumina, a halogenated alumina, an alumina doped with silicon, an alumina-titanium oxide mixture, a sulphated zirconia, a zirconia doped with tungsten, or mixtures thereof.

8. A catalyst according to claim 1, characterized in that the support is constituted by an amorphous silica-alumina.

9. A catalyst according to claim 8, characterized in that the support contains 1–95% by weight of silica and the catalyst contains 0.05–10% by weight of noble metal.

10. A catalyst according to claim 1, characterized in that the support is a silica-alumina-titanium oxide.

11. A catalyst according to claim 1, characterized in that the noble metal is platinum or palladium.

12. A catalyst according to claim 1, wherein the dispersion of the noble metal is more than 1%.

13. A catalyst according to claim 1, wherein the dispersion of the noble metal is more than 5%.

14. A catalyst according to claim 12, wherein the noble metal is platinum.

15. A catalyst according to claim 1, having a dispersion of about 19%.

16. A catalyst according to claim 1, having a dispersion of 19%.

17. A catalyst according to claim 1, comprising at least platinum deposited on an acidic support, wherein the dispersion of the platinum is more than 1%.

18. A process for converting a feed containing hydrocarbons, comprising contacting said feed with a catalyst according to claim 1.

19. A process according to claim 18, wherein said noble metal is platinum or palladium.

20. A process according to claim 19, in which n-paraffin hydroisomerization also takes place.

21. A process according to claim 18, in which the feed containing hydrocarbons with an initial boiling point of more than 1 75° C. is brought into contact with the catalyst under a partial pressure of hydrogen of 2–25 MPa, a temperature of 200–450° C., with an hourly space velocity of 0.1–10 $h^{-1}$ and a $H_2$/hydrocarbon volume ratio of 100–2000 liter/liter.

22. A process according to claim 18, in which the feed is a cut from a Fischer-Tropsch process, a middle distillate, a vacuum residue, a hydroconversion residue, an atmospheric residue, a polyalphaolefin, or a synthesized oil.

23. A process according to claim 18, in which prior to conversion hydroisomerization, the feed has been hydrotreated to produce a sulfur content of less than 1000 ppm by weight, a nitrogen content of less than 200 ppm by weight, a metal content of less than 50 ppm by weight and an oxygen content of at most 0.2% by weight.

24. A process according to claim 23, in which an effluent from conversion with hydroisomerization of the hydrotreated feed is fractionated into at least one middle distillate and/or at least one heavy fraction with an initial boiling point of at least 350° C., said heavy fraction optionally is solvent dewaxed.

25. A process according to claim 18, in which a hydrotreatment catalyst contains at least one member selected from the group consisting of at least one group VIII non-noble metal, at least one group VIB metal, and phosphorus.

26. A process according to claim 18, in which a hydrotreatment catalyst contains a member selected from the group consisting of at least one group VIII non-noble metal, at least one group VIB metal, and boron.

* * * * *